J. H. WENSLICK.
FASTENER FOR SECTIONAL COAL AUGER NUTS.
APPLICATION FILED APR. 7, 1913.
1,099,224.
Patented June 9, 1914.
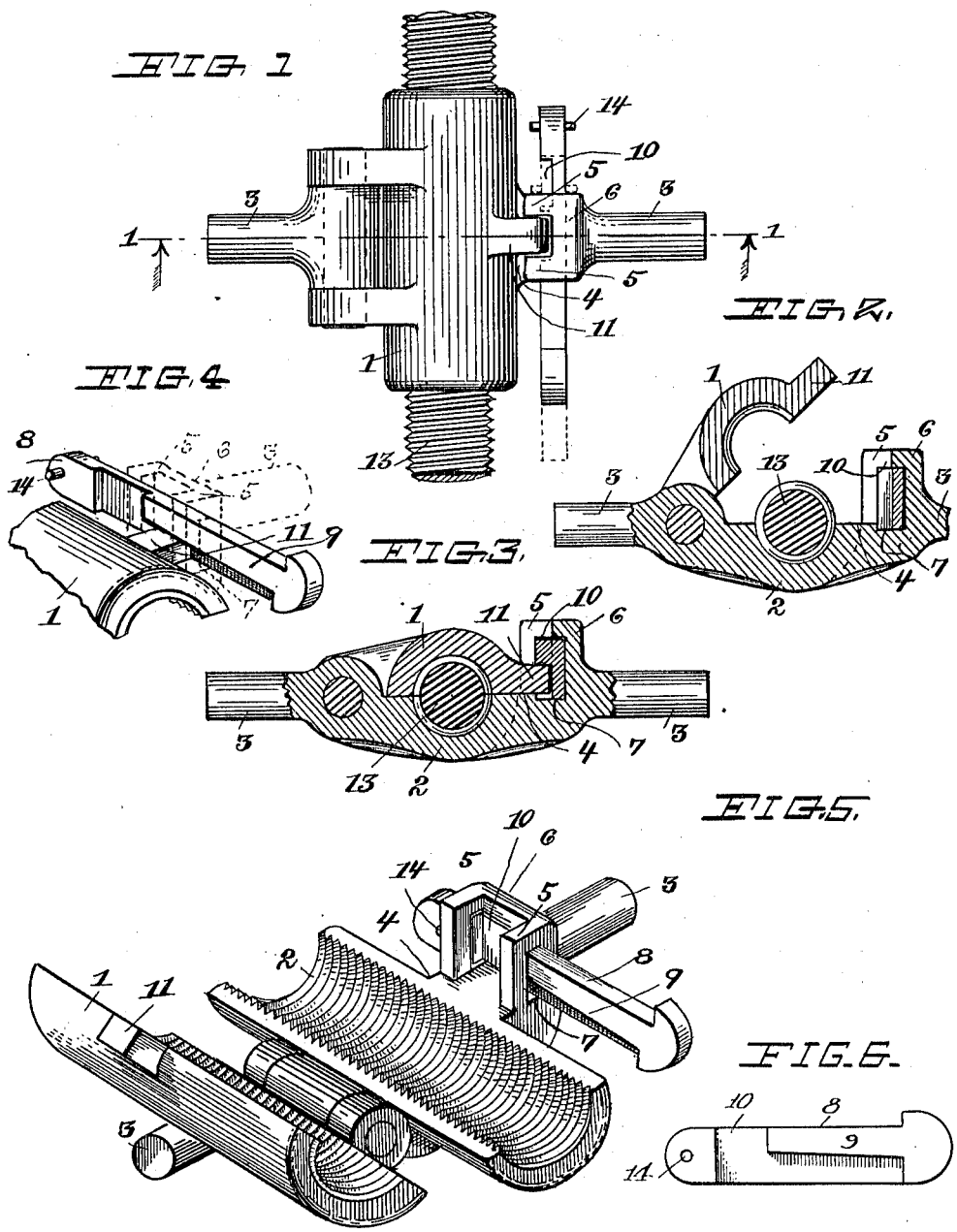
Witnesses:
Inventor.
John H. Wenslick
By Bond & Miller
Attorneys.

UNITED STATES PATENT OFFICE.

JOHN H. WENSLICK, OF CANAL FULTON, OHIO, ASSIGNOR TO THE FULTON TOOL WORKS, OF CANAL FULTON, OHIO, A CORPORATION OF OHIO.

FASTENER FOR SECTIONAL COAL-AUGER NUTS.

1,099,224.   Specification of Letters Patent.   Patented June 9, 1914.

Application filed April 7, 1913.   Serial No. 759,287.

*To all whom it may concern:*

Be it known that I, JOHN H. WENSLICK, a citizen of the United States, residing at Canal Fulton, in the county of Stark and State of Ohio, have invented certain new and useful Improvements in Fasteners for Sectional Coal-Auger Nuts, of which the following is a specification.

My invention relates to improvements in fasteners for sectional coal auger nuts in which means are provided for securely fastening the sections of the nut and holding the same in such a position that the drill or auger can be fed as the same is rotated.

The objects of the present invention are, first to securely fasten the sections together, and second, to provide means for retaining the securing device upon one of the nut sections, regardless of its position. These objects together with other objects readily apparent to those skilled in the art, I attain by the construction illustrated in the accompanying drawings, although my invention may be embodied in a variety of other mechanical forms, the construction illustrated being chosen by way of example.

In the accompanying drawing—Figure 1 is a view in elevation, showing a portion of the auger or drill shank. Fig. 2 is a transverse section of the auger or drill shank showing the sections in open position. Fig. 3 is a section on line 1—1, Fig. 1. Fig. 4 is a perspective view showing a portion of one of the sections in full lines and a portion of the other section in dotted lines with the key in position to fasten the sections together. Fig. 5 is a view showing the sections in opened position and the key in position to release the sections. Fig. 6 is a face view of the key.

Similar numerals of reference indicate corresponding parts in all the figures of the drawing.

In the accompanying drawing, 1 represents the hinged nut section and 2 the body section. The body section 2 is provided with the usual trunnions 3, which trunnions are located in bearings in the usual manner. The body portion 2 is provided with the laterally extended flange 4, which flange is provided with the parallel flanges 5, joined together by the integral back 6. The parallel flanges 5 are provided with elongated apertures 7, through which a fastening key 8 passes, said key being carried by the parallel flanges 5. The key 8 is provided with the wedge shaped flange 9, which wedge shaped flange is located upon one side of the key 8 and at the upper portion or part thereof. The wedge shaped flange 9 is formed of a length less than the length of the key 8, by which arrangement a recess or passage 10 is provided, and when the key 8 is in the position shown in Fig. 5 the lug 11 is free to pass the key 8 and lie upon the lateral flange 4 and between the parallel flanges 5, but when the key 8 is moved endwise when the sections 1 and 2 are in the position shown in Fig. 3 the under edge of the wedge shaped flange 9 will come upon the top face of the lug 11, thereby securely fastening the nut sections 1 and 2 together and in such a manner as to hold the nut sections in proper relationship upon the screw threaded drill or auger shank 13, so that when the drill shaft is rotated the auger or drill will be fed forward in the usual manner.

The lug 11 is formed integral with the hinged section or member 1 and is so located that when the sections are brought into closed position and the lug 11 between the flanges 5, the key 8 can be moved endwise, which movement brings the wedge shaped flange 9 over the top of said lug 11.

For the purpose of preventing the key 8 from becoming detached the cross pin 14 is provided, which cross pin is so located with reference to the recess 10, that when the pin 14 strikes one of the parallel flanges 5, said recess will register or be in alinement with the parallel flanges 5, thereby setting or stopping the key 8 in proper position to release the lug 11 and permit the hinged section to be turned into open position. The cross pin also serves the purpose of preventing the key from becoming separated or detached from the section 2. The wedge shaped flange 9 is originally formed so that the key will securely fasten the sections before said key has been driven endwise its extreme distance, by which arrangement the wear from use will not interfere with the fastening of the nut sections together. Owing to the fact that as the underside of the wedge shaped flange 9 wears away or the top of the lug 11, the key can be driven still farther endwise, thereby further compensating for the further wear which takes place by continuous use.

By providing the wedge shaped flange 9 and locating the same upon one side of the key 8 the under side, or inclined face of said wedge shaped flange will ride upon the top of the lug 11, thereby lifting the key upward and binding the key between the lug 11 and the upper faces of the elongated apertures 7 by which action the key is held in place during the time the auger or drill shank 13 is rotated.

For the purpose of properly guiding the key when it is moved endwise to secure the sections together or to release the sections the wedge shaped flange 9 is formed of a width less than the width of the key, but of a width to correspond substantially with the length of the apertures formed in the parallel flanges 5, reference being had to the size of the apertures and the size of the key to provide for the easy endwise movement of said key to lock and release the hinged members.

Having fully described my invention what I claim as new and desire to secure by Letters Patent, is—

1. In a device of the character described the combination of sections hinged together, said sections adapted to receive a drill-shank, one of said sections provided with flanges having apertures, a key located through said apertures, said key provided upon one of its faces with a wedge shaped flange formed of a length less than the length of the key, and a recess located in one side of the key, the other section provided with a lug adapted to be placed between the flanges having the apertures, said lug adapted to enter the recess in the key, the wedge shaped portion of the key adapted for contact with the lug when the members are in closed position.

2. In a device of the character described, the combination of sections hinged together, said sections adapted to receive a drill-shank, one of said sections provided with flanges having apertures, a key located through said apertures, said key provided upon one of its faces with a wedge shaped flange and a recess and the other section provided with a lug adapted to be placed between the flanges having the apertures, the wedge shaped portion of the key adapted for contact with the lug when the members are in closed position and means for limiting the movement of the key in one direction.

3. In a device of the character described, the combination of sections hinged together, one of said sections provided with parallel flanges having apertures and the other section provided with a lug, a key slidably mounted in the flanges having the apertures, said key provided with a wedge shaped flange and of a length less than the length of the key and a recess, said wedge shaped flange formed of a length less than the width of the key.

In testimony that I claim the above, I have hereunto subscribed my name in the presence of two witnesses.

JOHN H. WENSLICK.

Witnesses:
 CLARENCE M. SHAFER,
 S. S. BLILER.

Copies of this patent may be obtained for five cents each, by addressing the "Commissioner of Patents, Washington, D. C."